Nov. 3, 1942.  G. L. JONES  2,300,675
LIQUID CONTROL GEAR
Filed May 31, 1941
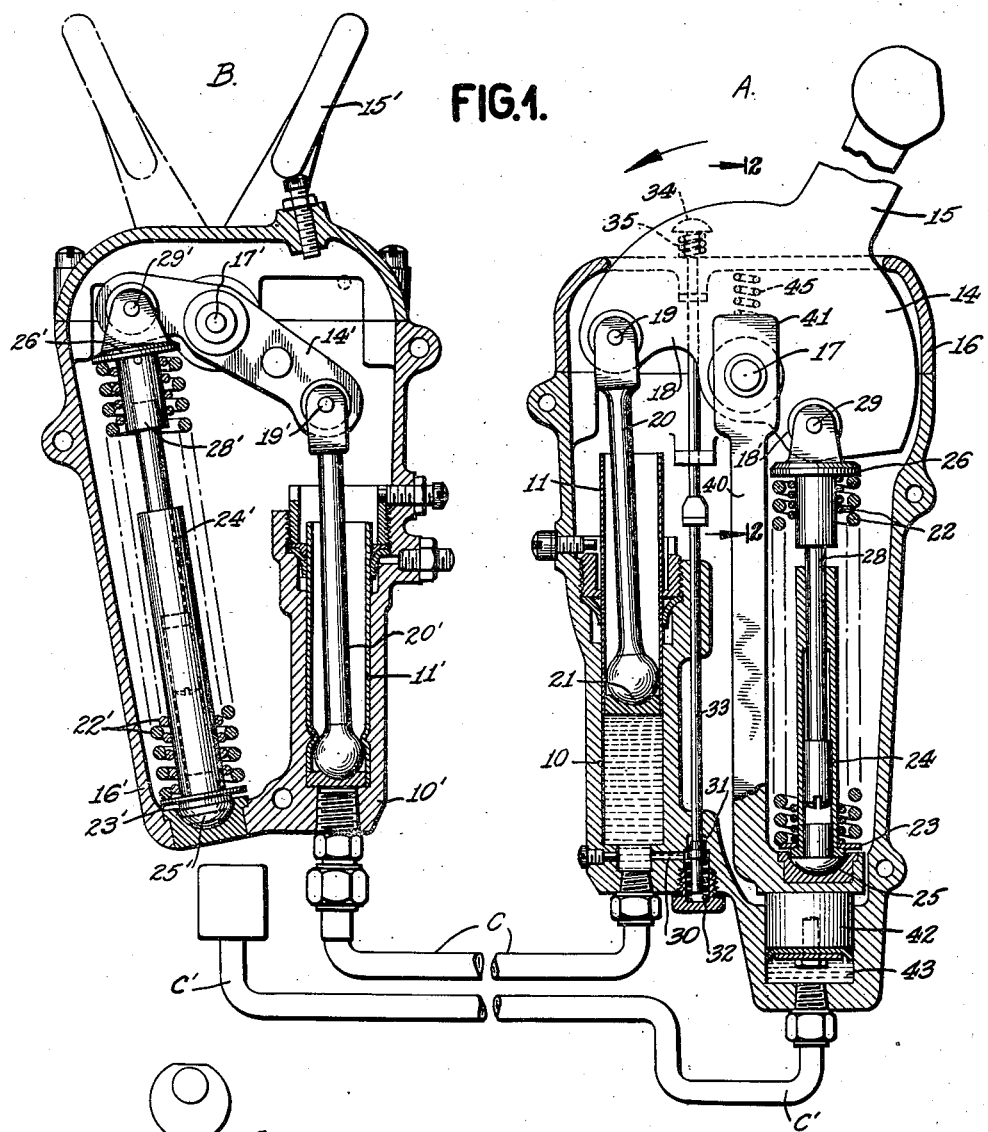
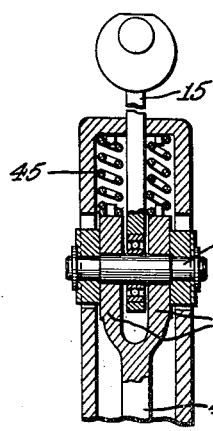
INVENTOR
GEORGE LESTER JONES
BY Joseph H. Lipschutz
ATTORNEY Patented Nov. 3, 1942

2,300,675

UNITED STATES PATENT OFFICE 2,300,675

LIQUID CONTROL GEAR

George Lester Jones, Garden City, N. Y., assignor to Sperry Products, Inc., Hoboken, N. J., a corporation of New York Application May 31, 1941, Serial No. 395,949

3 Claims. (Cl. 60—54.5)

This invention relates to liquid control gear of the type wherein movement of a member at a transmitting station is caused to control movement of a member at a receiving station. More particularly, this invention relates to control gear of this type wherein the transmitting and receiving stations are connected by a liquid transmission system. One such system is shown in the patent to H. S. Hele-Shaw and T. E. Beacham, No. 1,983,884, granted December 11, 1934, in which the object is to apply a constant force to the fluid system at the transmitting end and to receive a corresponding constant force at the receiving end. Another such system is shown in the patent to Alfred N. Lawrence, No. 2,197,554, granted April 16, 1940, for Liquid control gear in which the object consists in applying a constantly increasing force at the transmitting end to overcome a constantly increasing load at the operated or receiving end. In either of the aforementioned cases, the operating and operated members will retain any position into which they may be moved without any tendency on their part to return to a centralized position.

In this type of transmission system a problem arises due to the fact that the fluid in the transmission system changes its temperature, particularly at the receiving end, due to the operation of the mechanism at that end, and such change is at a greater rate than that of the pipe in which the transmitting fluid is contained. As a result, the parts at the receiving end are operated through a predetermined degree greater or less than the operation which has been transmitted thereto by the transmitting end. Thus, for instance, it has been found in cases where the receiving end is employed to operate a variable pitch propeller mechanism under control of a governor, that the temperature variation due to heating up of the fluid at the receiving end has caused variation in engine speed up to 200 R. P. M.

It is therefore the principal object of this invention to provide a transmission system of the type described wherein the relationship between the transmitter and the receiver will not be affected by temperature variations.

Further objects and advantages of this invention will become apparent in the following detailed description thereof.

In the accompanying drawing,

Fig. 1 is an assembly view, with parts sectioned vertically, of a liquid control gear embodying my invention.

Fig. 2 is a vertical section taken substantially on the line 2—2 of Fig. 1.

Referring to the drawing, it will be seen that this invention comprises three main parts, namely, a transmitting station A, a receiving station B, and a force-transferring means such as a connecting duct C adapted to be filled with a liquid. It will be apparent that force applied at one end of the liquid column will cause said column to move through the duct C to operate a member at the other end of said column. For applying forces to the liquid column for the purpose of transmitting forces, there may be provided a cylinder 10 within which operates a trunk type piston 11. Said cylinder is connected at one end to the duct C which is filled with liquid extending up to the said piston. For operating the said piston in a direction to transmit force to the liquid column there may be provided a transmitting element in the form of a lever 14 pivoted within the casing 16 on a pivot 17 specially mounted in a manner to be described hereinafter, and having an operating handle 15 and lever or crank arms 18 and 18'. The crank arm portion 18 is pivotally connected at 19 to the upper end of a piston rod 20 pivotally connected to the piston at 21. As the handle is moved in the direction of the arrow, the piston is lowered to cause the column of liquid to move through the duct C. The force which is applied to the piston is determined by one or more loading springs 22 seated at one end against a bracket 23 fixed upon a sleeve 24 pivoted at 25 in a special support to be described hereinafter. The other ends of said loading springs bear against a bracket 26 fixed to a rod 28 which operates within the sleeve member 24. The springs are under compression and apply the operating force to the lever arm 18' by way of the pivotal connection 29 between the upper end of rod 28 and the operating lever 14. The distance between the center of pivot 17 and the center of pivot 29 forms the crank arm 18' through which the force is applied. The positions of the springs and their connections are such that the springs act through a small lever arm to apply a very slight loading force to crank arm 18 and the piston 11 when the piston is in its uppermost position; but as the handle 15 is actuated in the direction of the arrow, it will be seen that the springs act through an increasing lever arm. At the same time, however, the springs are extended so that while they act through a larger lever arm they apply a decreasing force to said arm as the latter increases. The design of the various parts may be made such that the rate of decrease of the compressive force of the springs is equal to or slower than the rate of increase of the lever arm as handle 15 is actuated in the direction of the arrow, depending upon the purpose to which the device is to be put, that is, whether the product of these two factors should be a constant to yield a constant force, or whether said product shall yield a constantly increasing loading force. In either case the force which an operator applies to handle 15 is constant in spite of the increasing force on the piston and need only be sufficient to overcome friction in the system. The operation of handle 15 at the transmitting station just described will cause an element at the receiver end, such as piston 11', to be moved out of its cylinder and cause a piston rod 20' connected to said cylinder to actuate a lever 14' pivoted at 17'. The piston rod 20' is pivotally connected to one end of lever 14' at 19' and said lever 14' is pivotally connected at its other end at 29' to a two-part extensible member 24', 28' pivoted at its other end at 25' in the casing 16', the said two-part element 24', 28' being similar to the element 24, 28 at the receiving end. The two parts similarly hold between brackets 23' and 26' a set of compression springs 22' similar to springs 22. The distances between pivot 17' and pivot 19' and between 17' and 29' are the same as between pivot 17 and pivots 19 and 29. Thus it will be seen that the relationship of the parts at the transmitter and receiver are the same but in inverse order, and therefore a force transmitted by movement of piston 11 will produce an equal movement of piston 11'. An operating member or handle 15' fixed to move with lever 14' will therefore move in parallel relationship to handle 15 in whichever position handle 15 is placed.

The casing 16 is filled with liquid above the level of the cylinder 10 and in order to maintain the liquid column filled, the leakage from said column may be replenished by connecting the said cylinder by way of passage 30 and valve 31 to the liquid within the casing 16. This may be done by depressing said valve 31 against the action of spring 32 by means of a rod 33 fixed to said valve and extending to the outside of the casing where said rod may be depressed by pushing on the upper end 34 thereof against the action of a restoring spring 35.

When there is variation of temperature which may affect the fluid in the transmission system, the liquid will tend to expand or contract, and thus operated member 15' will tend to change its relationship with respect to operating member 15. An error in the transmission system is thus introduced and, as stated hereinbefore, where the operated member 15' is a governor control it has been found that such temperature variations may cause variations in the engine speed of as high as 200 R. P. M. The problem therefore consists in devising a system whereby the variations in temperature of the fluid in the transmission system will not affect the relationship of the operating and operated elements. For this purpose I have provided the following solution:

Whereas heretofore the pivot 17 about which the lever 14 rocked was fixedly mounted in the casing 16, I now provide for mounting said pivot in the forked upper end 41 of a rod 40 which is supported within the casing 16 for vertical linear movement by means of a piston 42 at the lower end thereof operating within a cylinder 43 formed in said casing and communicating with a duct C' substantially similar to the duct C in all respects. That is to say, duct C' is similarly positioned parallel to duct C so as to be subject to the same temperature conditions, is preferably of substantially the same dimensions, and contains the same quantity of fluid. Duct C', however, is closed at one end and at its other end extends into cylinder 43. The rod 40 and pivot 17 are therefore supported on the column of fluid within duct C' and cylinder 43. Compression springs 45 between the roof of casing 16 and the upper forked ends 41 of rod 40 continuously maintain the rod in firm seating engagement with its column of liquid and are of sufficient strength to resist displacement of pivot 17 during the normal operation of the transmission mechanism.

The operation of this device in response to temperature change now becomes apparent. Take, for example, the case where there is a substantial decrease in temperature. Since the duct C is open at both ends, the fluid in cylinders 10 and 10' would ordinarily tend to contract. The fluid in duct C' and cylinder 43, being of the same volume as the fluid in duct C and cylinders 10 and 10', will contract an equal amount. Duct C', however, is closed at one end and has a piston under pressure at the other end. Therefore the entire contraction of the fluid takes place at one end and the piston 42 will move through a distance corresponding to the entire contraction of the liquid. Since the pivot 17 is carried by the rod 40 which is supported on piston 42, the pivot 17, and hence piston 11, will be lowered a distance corresponding to the contraction of the entire fluid volume in duct C. Thus the entire diminution in volume within duct C and cylinders 10 and 10' is taken up by the linear, downward movement of pivot 17 carrying piston 11 therewith so that handle 15 is not rotated about pivot 17. Since the entire compensation is performed at one end (in this case the transmitter end), no movement of piston 11' and therefore no rotation of handle 15' takes place at the other end (in this case the receiving end). Thus temperature compensation has been effected automatically without changing the relationship between members 15 and 15'. Similarly, if the liquid expands, pivot 17 will be raised linearly, thus raising piston 11 an amount equal to the full correction for expansion of the fluid in duct C. Thus no rotary movement of member 15 around its pivot will take place, and since the entire correction is taken up by the linear movement of pivot 17 and piston 11 there will be no movement of piston 11' as a result of the fluid expansion, and hence no movement of member 15' around its pivot.

By confining to one end of the transmission system (in this case the transmitting end), the total changes caused by temperature variations, and causing the pivot of the operating member at the affected end to move linearly, actuation of said operating and operated members in response to temperature variations is prevented.

While duct C' has been described as preferably of substantially the same dimensions as duct C so as to contain the same quantity of fluid, it will be understood that duct C' may contain a larger or smaller quantity of liquid than duct C provided a liquid is selected whose temperature coefficient is correspondingly different; in other words, so that the total volumetric expansion of the liquid in duct C' will be the same as that in duct C. As a further variation, the dimensions of duct C' and the liquid chosen for said duct may be such that the total volumetric expansion of the liquid is not the same as that of the liquid in duct C, but in this case, instead of the 1:1 connection from the piston 42 to the pivot 17 there would be a linkage either multiplying or reducing, so that the linear movement of pivot 17 was equal to the linear movement of the liquid in duct C caused by expansion or contraction.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a remote control system comprising a transmitting station including a transmitter element having a pivot, means for supporting said element for movement around said pivot, a receiving station including a receiver element having a pivot, means for supporting said receiver element for movement around said last-named pivot, a liquid force-transferring connection between said stations whereby movement of said transmitter element around its pivot moves said receiver element around its pivot, means for supporting one of said pivots for linear movement toward and away from said connection, means for applying a load to the transmitter element independent of the load applied by the operator, said first load being equal to the load on the receiver element in every position of said elements, and means for preventing dissimilar movements of said elements caused by temperature variations of the liquid in said connection, said last-named means comprising means for moving said movable pivot linearly.

2. In a remote control system comprising a transmitting station including a transmitter element having a pivot, means for supporting said element for movement around said pivot, a receiving station including a receiver element having a pivot, means for supporting said receiver element for movement around said last-named pivot, a liquid force-transferring connection between said stations whereby movement of said transmitter element around its pivot moves said receiver element around its pivot, means for supporting said transmitter element pivot for linear movement toward and away from said connection, means for applying a load to the transmitter element independent of the load applied by the operator, said first load being equal to the load on the receiver element in every position of said elements, and means for preventing dissimilar movements of said elements caused by temperature variations of the liquid in said connection, said last-named means comprising means for moving said movable pivot linearly.

3. In a remotes control system comprising a transmitting station including a transmitter element having a pivot, means for supporting said element for movement around said pivot, a receiving station including a receiver element having a pivot, means for supporting said receiver element for movement around said last-named pivot, a liquid force-transferring connection between said stations whereby movement of said transmitter element around its pivot moves said receiver element around its pivot, means for supporting one of said pivots for linear movement toward and away from said connection, means for applying a load to the transmitter element independent of the load applied by the operator, said first load being equal to the load on the receiver element in every position of said elements, and means for preventing dissimilar movements of said elements caused by temperature variations of the liquid in said connection, said last-named means comprising a container with liquid positioned to be subject to the same temperature variations as the liquid in said connection, said container being closed at one end and open at the other, a piston in engagement with the liquid in said open end, means for causing said piston to follow said liquid during expansion and contraction of the liquid in said container, and a connection between said piston and said movable pivot for moving said pivot linearly.

GEORGE LESTER JONES.